United States Patent
Resan et al.

(10) Patent No.: US 7,430,071 B2
(45) Date of Patent: Sep. 30, 2008

(54) ADJUSTABLE PULSE-SHAPER

(75) Inventors: Bojan Resan, San Jose, CA (US); R. Russel Austin, Cool, CA (US); Jason P. Watson, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/602,147

(22) Filed: Nov. 20, 2006

(65) Prior Publication Data

US 2007/0268546 A1 Nov. 22, 2007

Related U.S. Application Data

(60) Provisional application No. 60/800,733, filed on May 16, 2006.

(51) Int. Cl.
*G02B 26/00* (2006.01)

(52) U.S. Cl. .................................... 359/237

(58) Field of Classification Search ............... 359/237, 359/284, 285, 305, 306, 308, 310, 563, 566, 359/559, 687, 688, 689, 690
See application file for complete search history.

(56) References Cited

U.S. PATENT DOCUMENTS

| | | | |
|---|---|---|---|
| 4,655,547 A | 4/1987 | Heritage et al. | 350/162.12 |
| 4,928,316 A | 5/1990 | Heritage et al. | 455/600 |
| 5,166,818 A | 11/1992 | Chase et al. | 359/170 |
| 5,526,171 A | 6/1996 | Warren | 359/285 |
| 5,689,361 A * | 11/1997 | Damen et al. | 359/284 |
| 6,081,379 A | 6/2000 | Austin et al. | 359/584 |
| 6,115,402 A | 9/2000 | Caprara | 372/101 |
| 6,154,318 A | 11/2000 | Austin et al. | 359/584 |
| 6,327,068 B1 | 12/2001 | Silberberg et al. | 359/239 |
| 6,577,782 B1 | 6/2003 | Leaird et al. | 385/15 |
| 6,621,613 B2 | 9/2003 | Silberberg et al. | 359/239 |
| 6,724,783 B2 | 4/2004 | Jalali et al. | 372/9 |
| 6,859,573 B2 * | 2/2005 | Bouevitch et al. | 385/16 |
| 7,058,251 B2 * | 6/2006 | McGuire, Jr. | 385/16 |
| 2004/0233944 A1 | 11/2004 | Dantus et al. | 372/25 |
| 2005/0017160 A1 | 1/2005 | Wolleschensky et al. | 250/234 |
| 2005/0232317 A1 | 10/2005 | Dantus et al. | 372/32 |
| 2006/0033923 A1 | 2/2006 | Hirasawa et al. | 356/450 |
| 2006/0056468 A1 | 3/2006 | Dantus et al. | 372/28 |
| 2006/0186327 A1 | 8/2006 | Wolleschensky et al. | 250/234 |

FOREIGN PATENT DOCUMENTS

WO WO 2006/012463 A2 2/2006

OTHER PUBLICATIONS

A.M. Weiner, "Femtosecond pulse shaping using spatial light modulators," *Review of Scientific Instruments*, vol. 71, No. 5, May 2000, pp. 1929-1960.

L. Xu et al., "Programmable Chirp Compensation for 6-fs Pulse Generation with a Prism-Pair-Formed Pulse Shaper," *IEEE Journal of Quantum Electronics*, vol. 36, No. 8, Aug. 2000, pp. 893-899.

* cited by examiner

*Primary Examiner*—Hung X. Dang
*Assistant Examiner*—Tuyen Q Tra
(74) *Attorney, Agent, or Firm*—Stallman & Pollock LLP

(57) ABSTRACT

An optical pulse-shaper includes a prism, a delay line having positive optical power and a reflective spatial light modulator. In one arrangement the delay line has a selectively variable optical path length for accommodating pulses of different spectral bandwidth and positive optical power is provided by a concave mirror. In another arrangement, the delay line includes a zoom-mirror arranged to provide selectively variable optical power for accommodating pulses of different spectral bandwidth.

18 Claims, 8 Drawing Sheets

ADJUSTABLE PULSE-SHAPER

PRIORITY CLAIM

This application claims the priority of U.S. Provisional Application Ser. No. 60/800,733, filed May 16, 2006.

TECHNICAL FIELD OF THE INVENTION

The present invention relates generally to ultrafast lasers. The invention relates in particular to manipulating the spectral and temporal characteristics of laser pulses delivered by an ultrafast laser or an ultrafast laser plus an amplifier, adjusting either the amplitude or the phase of input ultrafast pulses and thereby controlling the pulse bandwidth or spectral content of shaped pulses.

DISCUSSION OF BACKGROUND ART

Pulse shaping is desirable in many applications involving ultrafast laser pulses. A notable example of such an application is the adjustment of pulse bandwidth to enhance pulse compression and consequently enable the generation of pulses having a shorter duration than those obtained directly from an ultrafast laser oscillator. Pulse shaping can be achieved through the well-known technique of spatially dispersing the spectral content of a pulse using a diffraction grating, transforming the pulse into a Fourier plane using appropriate imaging optics, then manipulating the amplitude or phase of the dispersed components of the pulse in the Fourier plane using a spatial light modulator (SLM). The modulated pulse is then re-transformed to the time domain with an additional imaging optics and a second grating or by back-propagating the pulse through the input optics in reverse order to obtain a modified pulse.

Such a pulse-shaping scheme is typically optimized for a specific pulse bandwidth and will yield degraded performance when attempting to manipulate pulses with spectral content differing from that anticipated by the nominal optical configuration. It would be advantageous to develop a pulse shaping offering more flexibility in handling differing input pulse bandwidths while retaining a high degree of programmability and convenience of use.

SUMMARY OF THE INVENTION

The present invention is directed to the shaping of ultrafast laser pulses. In one aspect, apparatus in accordance with the present invention for comprises a dispersive optical element, an optical delay line having a selectively variable optical path length, and a spatial light modulator. The dispersive optical element, the optical delay line, and the spatial light modulator are configured and arranged such that the pulse is received by the prism and dispersed into spectral components of the pulse in one transverse axis (the Y-axis) of the apparatus. The dispersed components are collimated in the optical delay line and are delivered to the spatial light modulator. The collimated spectral components are selectively modulated by the spatial light modulator and return from the spatial light modulator back through the optical delay line. The selectively modulated spectral components are focused by the optical delay line on the dispersive optical element and recombined by the dispersive optical element to form the shaped output pulse.

In another aspect of the present invention, the optical delay line includes first and second pairs of mirrors, with mirrors in each pair being spaced apart and parallel to each other. Light passing through the delay line is delayed by undergoing multiple reflections in a zigzag path between the mirrors in the mirror pairs. The mirror pairs are selectively tiltable about a second transverse axis (the X-axis) perpendicular to the first transverse axis. The selective tilting varies the number of multiple reflections and accordingly the optical length of the delay line. An optical element having positive optical power is located between the first and second pairs of mirrors. The optical element collimates the spectral components dispersed by the prism and focuses the modulated spectral components on the prism.

In yet another aspect of the present invention apparatus in accordance with the present invention comprises a dispersive optical element, a spatial light modulator, and a zoom optical arrangement having selectively variable optical power located on an optical path between the dispersive optical element and the spatial light modulator.

In a preferred embodiment of the present invention including the zoom optical arrangement is a reflective arrangement, and the optical path distance between the dispersive optical element and the zoom optical arrangement, and the optical path distance between the zoom optical arrangement and the spatial light modulator are fixed.

DETAILED DESCRIPTION OF THE INVENTION

Figure 1:
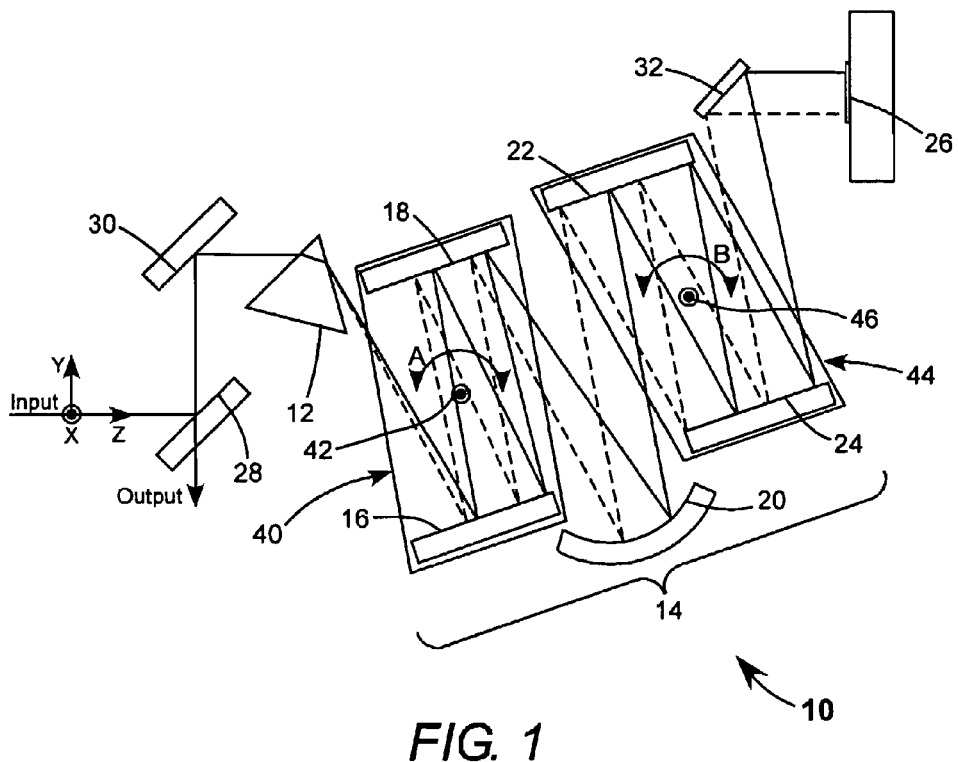
FIG. 1 schematically illustrates one preferred embodiment of a pulse-shaper in accordance with the present invention having a single dispersive prism, two pairs of selectively tiltable flat, parallel mirrors forming an adjustable optical delay line, a concave mirror to image the dispersed pulse, and an SLM used in reflective mode to redirect an input pulse back through the delay line and prism to reconstruct a shaped output pulse, as viewed from above the plane in which the pulse is dispersed.
Figure 2:
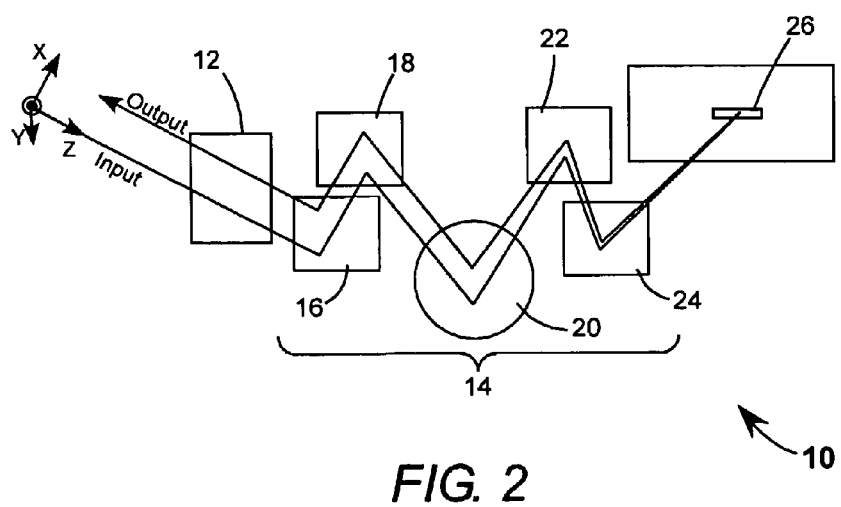
FIG. 2 schematically illustrates the preferred embodiment of a pulse-shaper in accordance with the present invention as shown in FIG. 1 when viewed from a direction parallel to the plane in which the pulse is dispersed.

Turning now to the drawings, wherein like components are designated by like reference numerals, FIG. 1 and FIG. 2 schematically illustrate a preferred embodiment 10 of pulse shaping apparatus in accordance with the present invention. Referring in particular to FIG. 1, wherein the apparatus is depicted in a transverse Y-Z plane thereof, apparatus 10 includes a prism 12, here an equilateral prism and a variable optical delay line 14 comprising a first pair of spaced-apart plane mirrors, 16 and 18 parallel to each other, a concave mirror 20 (a mirror having positive optical power) and a second pair of parallel plane mirrors 22 and 24, also spaced apart and parallel to each other. Preferably, the spacing between mirrors 16 and 18 is about the same as the spacing between mirrors 22 and 24. The apparatus also includes a linear spatial light modulator (SLM) 26 with the length thereof aligned parallel to the Y-axis of the apparatus.

An input pulse enters the apparatus and is steered by turning mirrors 28 and 30 to prism 12. The prism is preferably arranged with respect to the light beam of the pulse such that the light beam enters and exits the prism at an angle of incidence close to the Brewster angle for the prism material. The light beam of the pulse is dispersed by the prism with the longest-wavelength component being depicted by a solid line and the shortest-wavelength depicted by a dashed line. Other wavelengths have paths between those of the extreme wavelength components the whole forming a beam diverging in the Y-axis (in the Y-Z plane).

The angle of incidence of the pulse from the prism on mirror 16 is arranged such that the spectral component wavelengths of the pulse undergo a predetermined number of reflections, here two, from each of mirrors 16 and 18. After undergoing the predetermined number of reflections, the wavelength components of the pulse are incident on a concave mirror 20. Mirror 20 has a focal length about equal to the optical path length of the wavelength components from prism 12 to mirror 20. Because of this, the diverging beam of wavelength components is collimated, i.e., the wavelength components proceed parallel to each other.

The collimated beam of wavelength components is next incident on mirror 22. Mirrors 22 and 24 are arranged such that the angle of incidence of the collimated beam of wavelength components on mirror 22 is about the same as that of the diverging beam on mirror 16. Accordingly, in this exemplary case, wherein the spacing of mirrors 16 and 18 is about the same as the spacing of mirrors 22 and 24, the collimated beam undergoes two reflections at each of mirrors 22 and 24. After the second reflection from mirror 24 the collimated beam is directed by a turning mirror 32 to SLM 26.

The path length of the collimated beam from mirror 20 to SLM 26 is arranged to about equal to the focal length of mirror 20. This locates SLM 26 in a Fourier transform plane of apparatus 10. The collimated beam is in the form of a line of light, i.e., a spectrum of the input pulse, aligned on the one-dimensional SLM. The SLM is arranged such that the collimated beam is incident exactly normally thereon in the X-axis but the SLM is rotated slightly about the Y-axis, for example, by about a one degree, such that the Y-axis incidence of the pulse spectrum on the SLM is slightly non-normal. Accordingly, after being reflected from the SLM, the collimated beam of wavelength components returns through the optical delay line along a path parallel to the incidence path in the Y-axis but diverging from the incidence path in the X-axis as depicted in FIG. 2. Here, it should be noted that in FIG. 2 only one reflection per mirror in the delay-line mirror pairs is shown and mirrors 28, 30, and 32, and also platforms 40 and 44 are omitted for simplicity of illustration.

The collimated return beam is focused by mirror 20 on prism 12 which re-assembles the wavelength components of the beam along a common output path. The beam of re-assembled components, the output beam (pulse) is incident on mirror 30. The difference in X-axis height between the input and output beams on mirror 30 is such that the out put beam is reflected over mirror 20 and exits apparatus 10 on a path separate from that of the input beam (identified as "output" in FIGS. 1 and 2).

Preferably the optical path length from prism 12 to mirror 20 is selected according to the spectral bandwidth of an input pulse such that the line of light (spectrum) on SLM occupies as much of the length of the SLM as possible, without, of course, overlapping the ends of the SLM. In order that this can be effected for input pulses having different spectral bandwidths, the path length of an input pulse from the prism to the concave mirror can be varied in apparatus 10. Further, the path of the collimated beam from mirror 20 to SLM 26 can be correspondingly varied. This is accomplished as follows.

In apparatus 10, spaced apart, parallel, mirrors 16 and 18 are mounted on a platform 40 that is rotatable about an axis 42, about midway between the mirrors and parallel to the X-axis of the apparatus, as indicated by double arrow A. Similarly, spaced apart, parallel, mirrors 22 and 24 are mounted on a platform 44 that is rotatable about an axis 46, about midway between the mirrors and parallel to the X-axis of the apparatus, as indicated by double arrow B. Platform 40 can be rotated counter-clockwise to positions that will provide three, four or more reflections from each mirror thereon, or rotated clockwise such that the diverging beam is reflected only once from each mirror. Correspondingly, platform 44 can be rotated clockwise to positions that will provide three, four or more reflections from each mirror thereon, or rotated counter-clockwise such that the diverging beam is reflected only once from each mirror. The optical path lengths from the prism to the concave mirror and from the concave mirror to the SLM should be about equal.

To accommodate an increase or decrease in the path lengths from prism 12 to the concave mirror and from concave mirror to SLM 26, mirror 20 can be replaced with a mirror having a different focal length selected such that the divergent beam is still collimated by the mirror. It is also possible to deploy a deformable mirror as mirror 20 such that the mirror curvature can be changed at least incrementally to correspond with incremental changes in optical path length from the prism to the mirror and from the mirror to the SLM. It should be noted that in practice, following an incremental change in the path lengths between mirrors in the mirror pairs it may be necessary to make some fine adjustment to the alignment of mirrors 16, 18, 20, 22, 24, and 32 to optimize performance of the pulse shaping apparatus. For this reason it is advisable to provide appropriately adjustable mirror mounts for the mirrors, as is known in the art.

Figure 3:
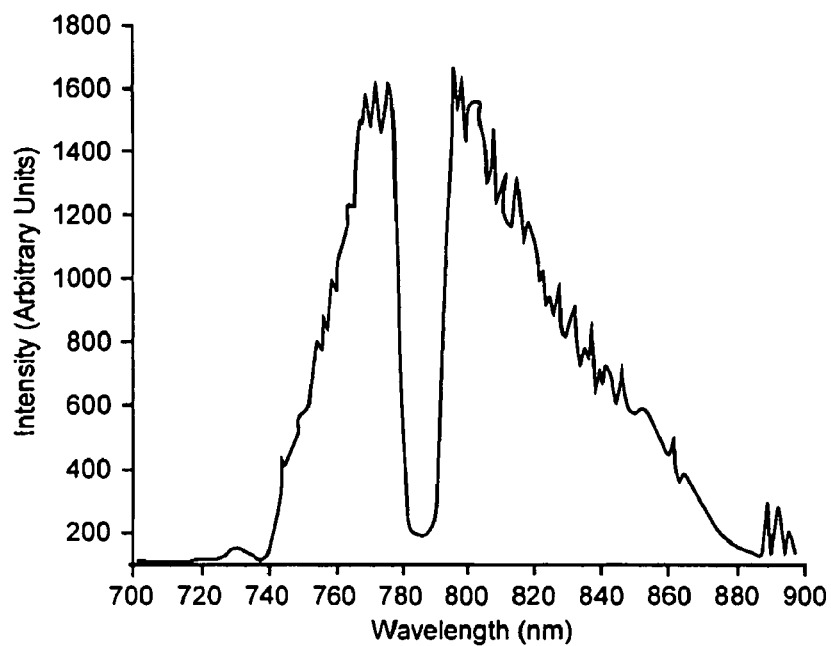
FIG. 3 is a graph schematically illustrating a demonstration of selective amplitude modulation within a dispersed pulse in the Fourier plane corresponding to near-total blockage of a single mid-pulse spectral region as observed after reflection from the SLM of FIG. 1.
Figure 4:
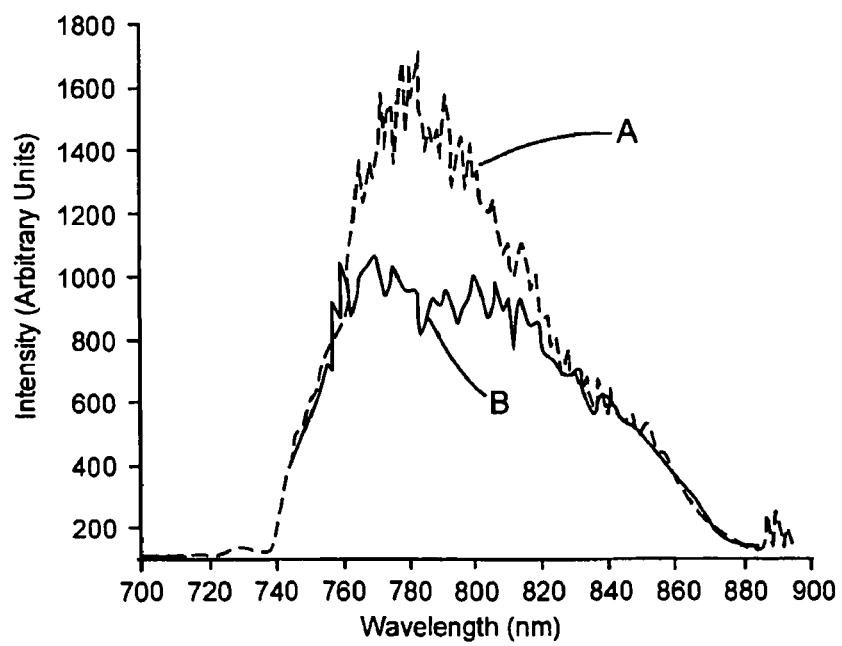
FIG. 4 is a graph schematically illustrating sample spectra observed experimentally, respectively, from an input pulse, indicated by the upper trace, and the broadened spectrum obtained from a shaped pulse, indicated by the lower trace, obtained by amplitude modulation in the Fourier plane as shown in FIG. 3.

FIG. 3 and FIG. 4 are graphs schematically illustrating measured intensity as a function of wavelength for an input pulse (FIG. 4, curve A) and an output pulse (FIG. 4, curve B) shaped in an example of apparatus 10. The manner in which the input pulse is modulated by SLM 26, i.e., the modulated spectrum of the pulse at SLM 26, is depicted in FIG. 3. In this example SLM 26 removed a portion of the pulse spectrum near the center (peak) wavelength of the pulse spectrum. The resulting output pulse retains essentially the same center wavelength as the input pulse (about 790 nm) but with a lower peak intensity, and a broader FWHM. Specifically, in this example, the input pulse had a FWHM of about 65 nm and the output pulse had a FWHM of about 100 nm.

In the above-discussed example of apparatus 10, SLM 26 was a model SLM-128 available from the CRi division of LOT-Oriel Optics Group, of Darmstadt, Germany. This SLM had a 128 pixel resolution (full length) and included an optical part and driving electronics. The optical part contained an input polarizer; two liquid-crystal array masks provided the spatial light modulation pixels; and a broadband protected silver coated mirror on the backside provided the reflective mode of operation. The SLM was powered from a standard power network and connected to a computer via USB cable. The amplitude or the phase of spectral components of the pulse could be modulated. Prism 12 was an equilateral prism made from SF-11 optical glass with the entrance and exit beams incident on corresponding prism surfaces at about 2° from the Brewster angle. Mirrors 16 and 18 and mirrors 22 and 24 were spaced apart by about 12.5 centimeters (cm). In each mirror pair the corresponding beams underwent two reflections from each mirror. Mirror 20 was a concave mirror having a radius of curvature of about 1.0 meters (m), i.e., a focal length of about 0.5 m. All mirrors were coated for maximum reflection over a spectral range from about 700 nm to about 900 nm with group velocity dispersion (GVD) of the coatings minimized over this spectral range. The Y-axis tilt of SLM 26 was arranged such that the output pulse (output beam) had a X-axis height about 1.0 centimeters (cm) greater than that of the input beam on mirror 30. Mirror 28 was positioned such that it did not intercept the output beam.

Figure 5:
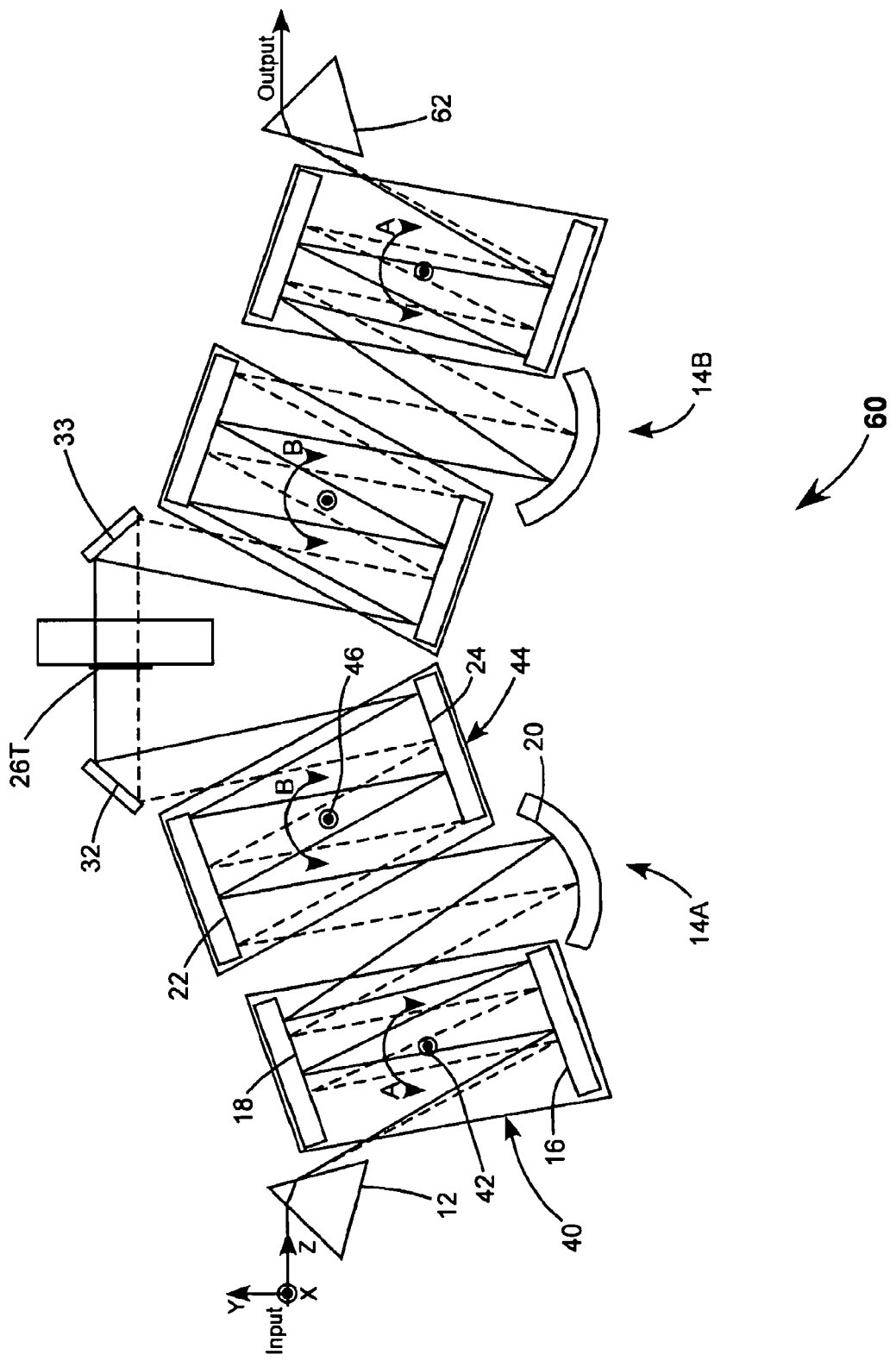
FIG. 5 schematically illustrates yet another embodiment of a pulse-shaper in accordance with the present invention similar to the embodiment of FIG. 1 but wherein the SLM is used in transmission and the output of the SLM is directed through a second variable optical delay line to a second prism to reconstruct the SLM output as a shaped output pulse.

FIG. 5 schematically illustrates yet another embodiment 60 of a pulse-shaper in accordance with the present invention. In pulse-shaper 60, the SLM, here designated SLM 26T is used in a transmissive mode. Pulse-shaper 60 includes two above-described variable delay lines 14 in accordance with the present invention with one thereof designated delay line 14A and the other designated as delay-line 14B. Delay line 14A is used to disperse the input pulse and deliver a collimated spectrum of the pulse on SLM 26 to be modulated in transmission or phase. The modulated spectrum is reconstructed (re-assembled) into an output pulse by variable delay line 14B acting in cooperation with a second prism, here designated prism 62.

An advantage of pulse-shaper 60, compared with pulse-shaper 10 is the SLM 26T operates somewhat more efficiently than SLM 26 operated in the reflection mode. Further, there is no requirement to tilt the SLM so that input and output pulses can be separated. These advantages come, however, at the expense of a greater part count, and a requirement for twice as many rotations of mirror pairs being required to select a particular delay-line path-length.

Figure 6:
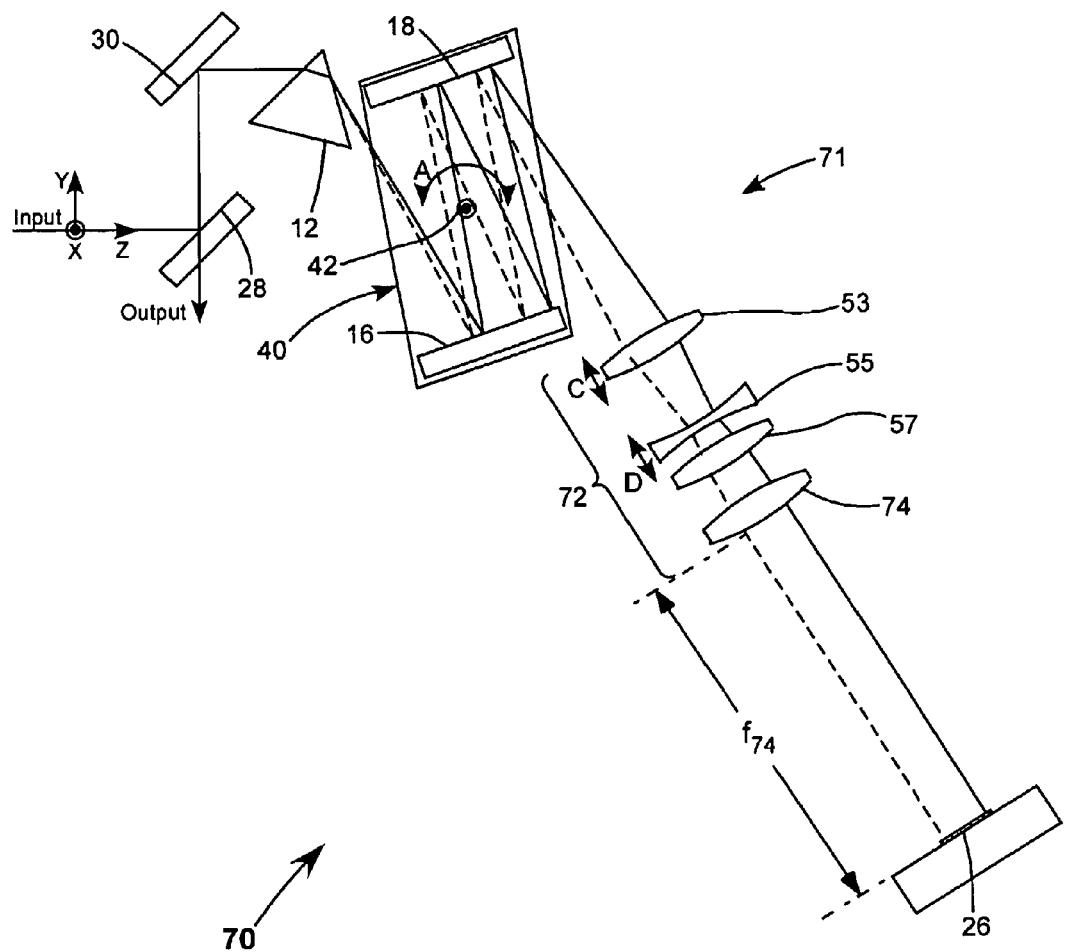
FIG. 6 schematically illustrates still another embodiment of a pulse-shaper in accordance with the present invention similar to the embodiment of FIG. 1 but wherein a zoom lens is substituted for the concave mirror and only one of the selectively tiltable mirror pairs is included, located between the prism and the zoom lens.

FIG. 6 schematically illustrates still another embodiment 70 of a pulse-shaper in accordance with the present invention. Pulse-shaper 70 is similar to pulse-shaper 10 of FIG. 1 with an exception that in a selectively variable delay line 71 a zoom lens 72 is substituted for mirrors 20, 22 and 24. Zoom lens 72 comprises an afocal zoom group, here, of two movable refractive elements 53, 55, and a fixed refractive optical element 57 in combination with a focusing element (lens) 74. This makes it possible to use only one selectively rotatable mirror-pair in delay line 71 to accommodate pulses of different spectral bandwidths. The reason for this is as follows.

Figure 7:
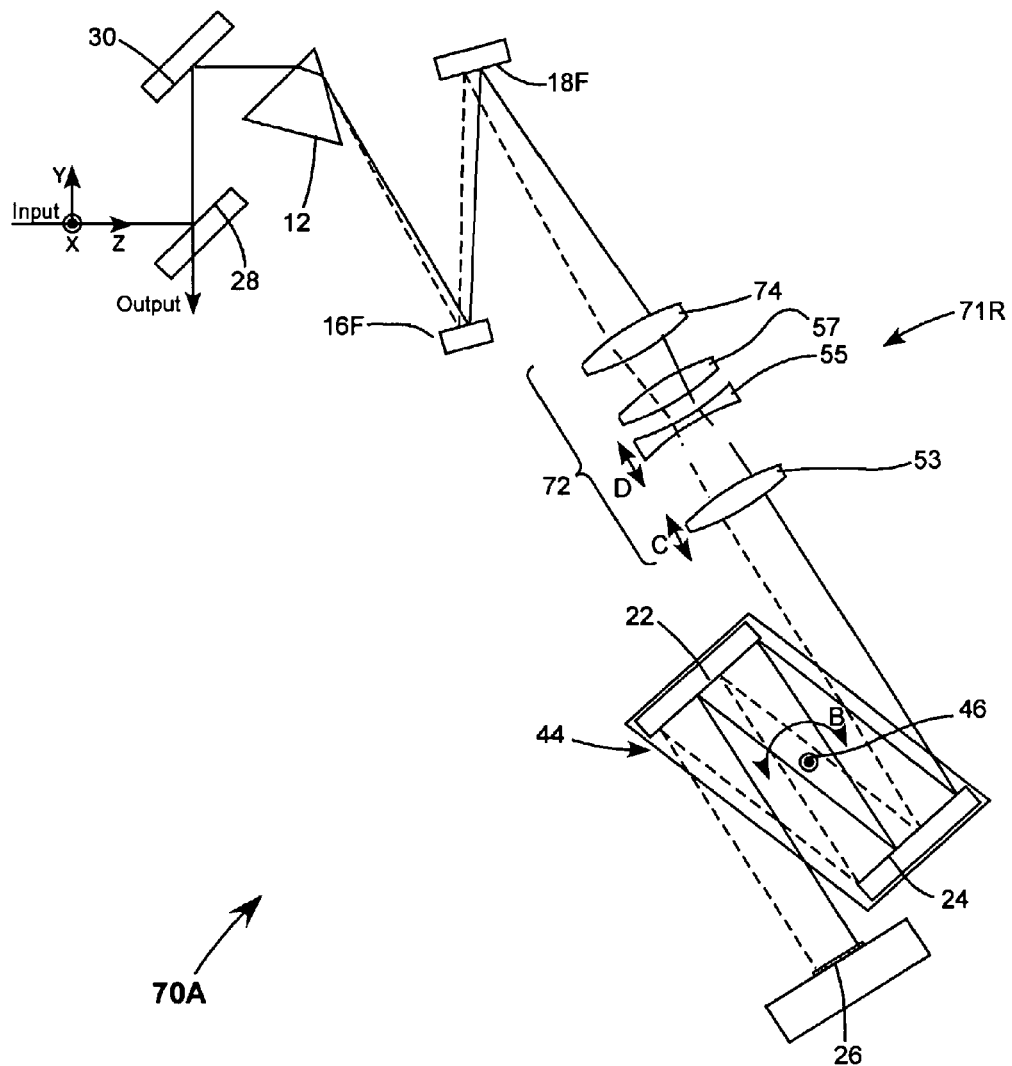
FIG. 7 schematically illustrates still another embodiment of a pulse-shaper in accordance with the present invention similar to the embodiment of FIG. 1 but wherein a zoom lens is substituted for the concave mirror and only one of the selectively tiltable mirror pairs is included, located between the zoom lens and the SLM.

If the number of reflections undergone by the diverging beam from prism 12 is changed, then elements 53 and 55 can be moved axially to change the front focal length of the zoom lens to accommodate the change in optical path length from the prism to the lens. The back focal length of zoom lens 72, however, is determined by the focal length ($f_{74}$) of fixed element 74 and remains essentially the same as the front focal length is changed. Accordingly the distance of SLM 26 from the zoom lens can remain fixed at distance $f_{74}$. It should be noted that the zoom lens arrangement of FIG. 7 is only one possible arrangement of a zoom lens. Those skilled in the optical design art may devise other arrangements including a different number, shape or arrangement of elements without departing from the spirit and scope of the present invention.

It is possible that the lens elements of the zoom group may introduce some group-delay dispersion in a pulse being shaped. Any such delay, however, could be at least partly compensated by making compensating phase adjustments via SLM 26 or providing compensation for group-delay dispersion in one or more of the mirrors of the pulse-shaper.

FIG. 7 schematically illustrates an embodiment 70A of a pulse-shaper in accordance with the present invention that is similar to embodiment to pulse-shaper 70 of FIG. 6 inasmuch as the pulse-shaper includes a selectively variable optical delay line 71R in which there is only one selectively tiltable mirror pair, here, mirror pair 44 including mirrors 22 and 24. In pulse-shaper 70A this mirror pair is located between the zoom lens and SLM 26. Zoom lens 72 is arranged with focusing lens (element) 74 thereof oriented toward prism 12. Fixed mirrors 16F and 18F serve to fold the optical path between the lens and the prism, which in this case is the fixed back-focal distance of the zoom lens. It is believed that this arrangement will provide less aberration in the beam at SLM 26 than the arrangement of pulse-shaper 70.

Figure 8:
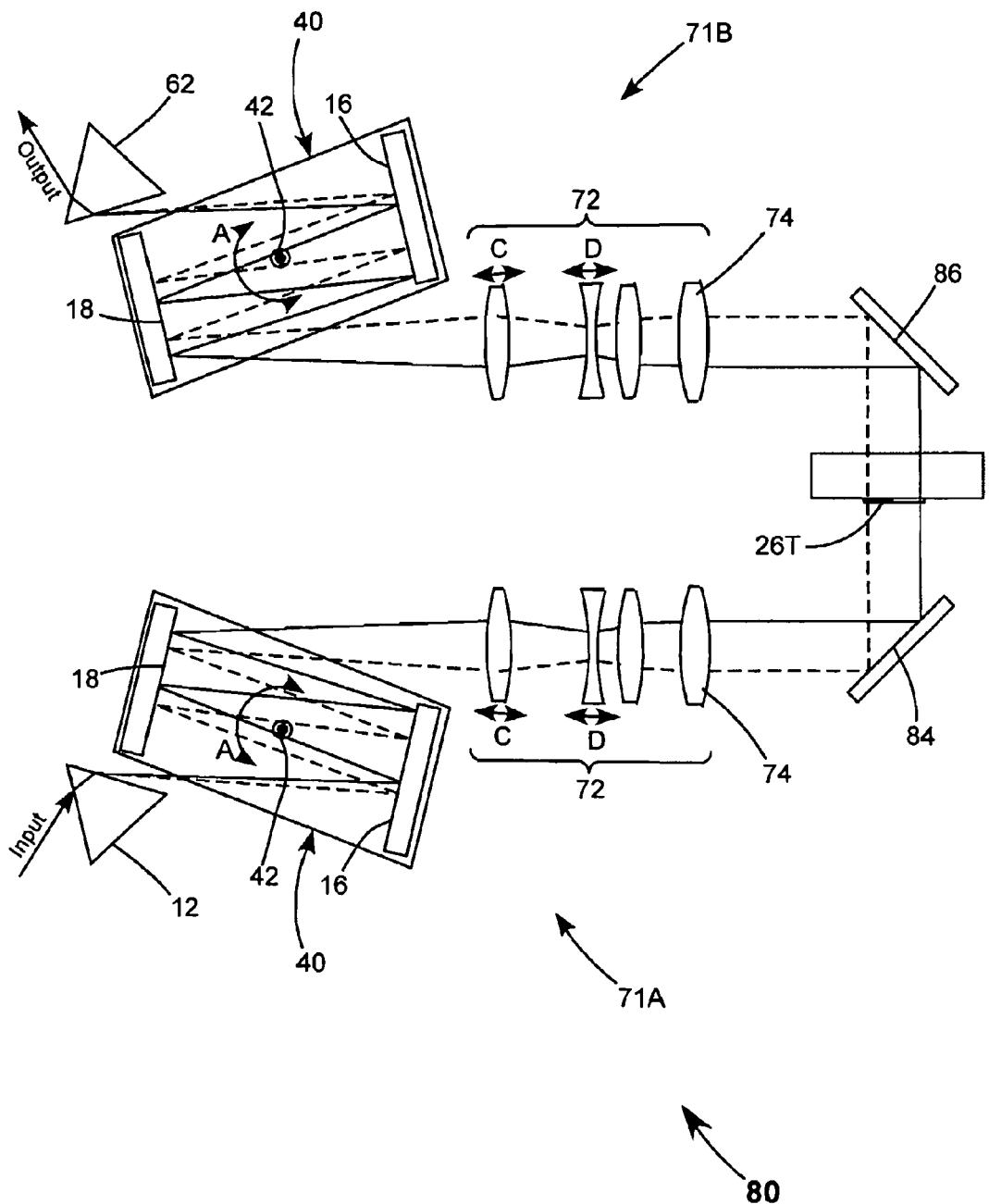
FIG. 8 schematically illustrates a further embodiment of a pulse-shaper in accordance with the present invention similar to the embodiment of FIG. 6, but wherein the SLM is used transmission and the output of the SLM is directed through a second variable optical delay line including a zoom lens and only one selectively tiltable mirror pair to a second prism to reconstruct the SLM output as a shaped output pulse.

The elimination of a rotatable mirror-pair afforded by the zoom lens can be exploited in a pulse-shaper in accordance with the present wherein the SLM is used in a transmissive mode. FIG. 8 schematically illustrates one such arrangement 80. In pulse-shaper 80 a prism 12 and a selectively variable delay-line optical arrangement 71A similar to delay line 71 of pulse-shaper 70 of FIG. 6, is used to deliver, via a turning mirror 84, a collimated spectrum of an input pulse to a transmissive-mode SLM 26T. SLM 26T is located at a distance from the zoom lens equal to the focal length of fixed focusing element 74 of the zoom lens of delay line 71A. The transmitted, modulated spectrum is delivered via a turning mirror 86 to another variable-delay-line, zoom-lens arrangement 71B. Delay line 71B is essentially delay line 71A used in reverse, and is cooperative with a prism 62 essentially identical to prism 12. Fixed focusing element 74 of the zoom lens of delay line 71B is located at a distance from the zoom lens equal to the focal length of fixed focusing element 74 of the zoom lens. Prism 62 is arranged to re-assemble the converging modulated spectrum components from the delay line on a common path to provide the shaped (output) pulse as described above with reference to other embodiments of the present invention.

Figure 9:
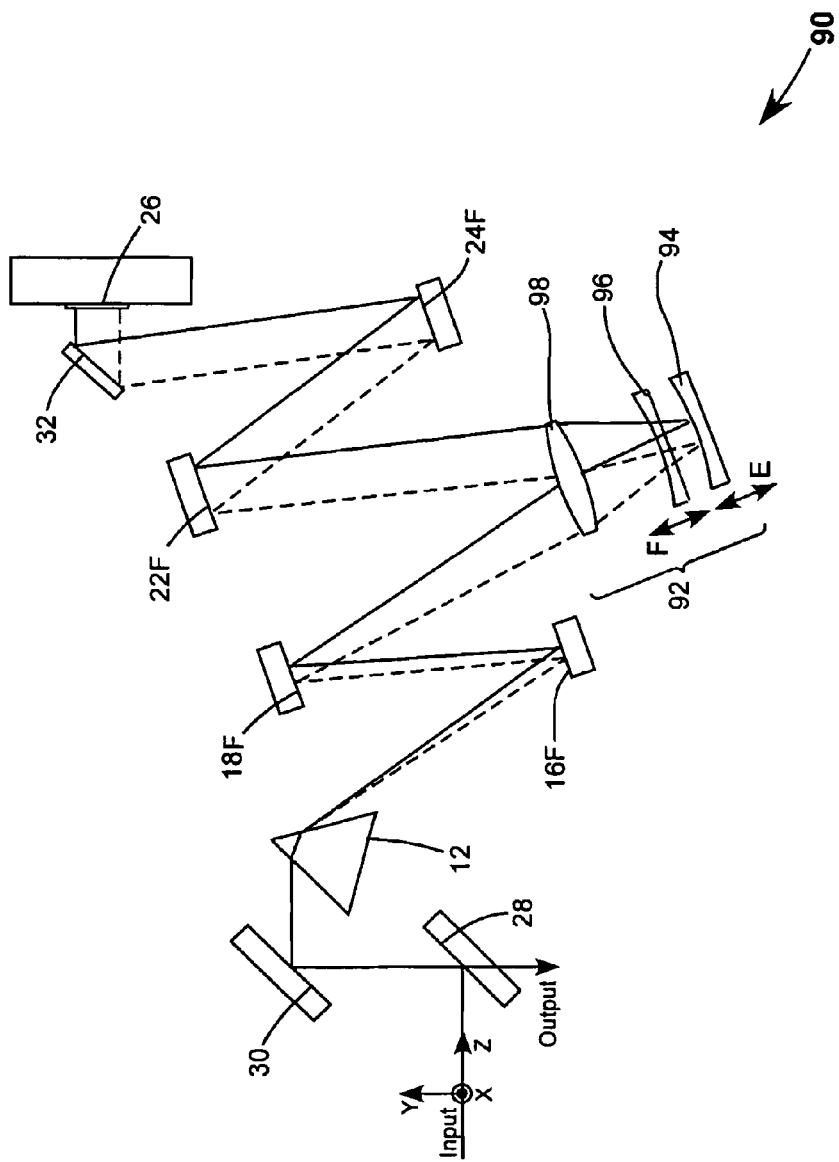
FIG. 9 schematically illustrates one additional preferred embodiment of a pulse-shaper in accordance with the present invention similar to the embodiment of FIG. 1, but including a zoom-mirror arranged such that a selectively variable optical delay line is not required.

FIG. 9 schematically illustrates a further embodiment 90 of pulse-shaping apparatus in accordance with the present invention. Pulse-shaper 90 is similar to pulse-shaper 10 of FIG. 1 with an exception that there are no selectively tiltable optical elements providing a selectively variable optical path for changing the width of a beam on an SLM. Fixed mirrors 16F and 18F and 22F and 24F, here, merely provide for folding the optical path to reduce the physical footprint of the pulse-shaper. Concave mirror 20 of pulse-shaper 10 is replaced in pulse shaper 90 by a catadioptric optical arrangement 92, which may be described as a "zoom mirror". This particular arrangement includes a group of optical elements comprising a concave mirror 94, a negative refractive element 96, and a positive refractive element 98. This group provides an equivalent of a mirror with variable optical power. Mirror 94 is selectively axially movable with respect to negative optical element 96 as indicated by arrows E. Optical element 96 is axially movable with respect to positive refractive optical element 98 as indicated by arrows F. The group is arranged such that whatever the divergence of light from prism 12, the light is formed into a collimated beam after a forward and reverse pass through the refractive optical elements.

Varying the spacings of positive and negative refractive elements 98 and 96, and negative refractive element 96 and mirror 94 varies the net optical power of the group and accordingly the width of the collimated beam. The group can be configured such that whatever the power of the group, the prism is always at a focal plane of zoom mirror 92. As the light traverses what is, in effect, a symmetrical grouping of optical elements in making the forward and reverse pass, the Fourier plane of the group stays at the same optical path distance from element 98 as the prism. This eliminates a requirement for any device for varying optical path, one or more of which are included in other above-described embodiments in accordance with the present invention. This also provides that the beam-width on the SLM is continuously variable in contrast with above described-embodiments of the present invention wherein the beam width is only incrementally variable.

In one test design, it was assumed that positive reflective element 98 had a focal length of about 100.0 millimeters (mm), negative refractive element 96 had a (negative) focal length of 50 mm and mirror 94 had a 100 mm radius of curvature. It was possible to compute an effective focal length for the group varying from 245 mm to about 800 mm. At the shortest focal length, the positive and negative refractive elements were separated by 24.5 mm and the negative refractive element and the mirror were separated by 44.0 mm. At the longest focal length, the positive and negative refractive elements were separated by 137 mm and the negative refractive element and the mirror were separated by 16.0 mm. The focal distance measured from element 98 was 200 mm.

It should be noted here that catadioptric group 92 is a relatively simple group for providing the above-described advantages. Depending on factors such as the zoom-ratio desired, the angle between the divergent light beam entering the group and the collimated beam leaving the group, the degree of optical correction, or if shorter zoom movements are desired, additional refractive elements may be required. One or more of the additional elements may be selectively movable in addition to or instead of the mirror or negative refractive element. Mirror 94, while described above as being a concave mirror, may be a plane mirror or a convex mirror. Given above-described principles of the present invention, the design of such groups could be performed by one-skilled in the optical design art, using commercially available optical design software, without departing from the spirit and scope of the present invention.

Figure 10:
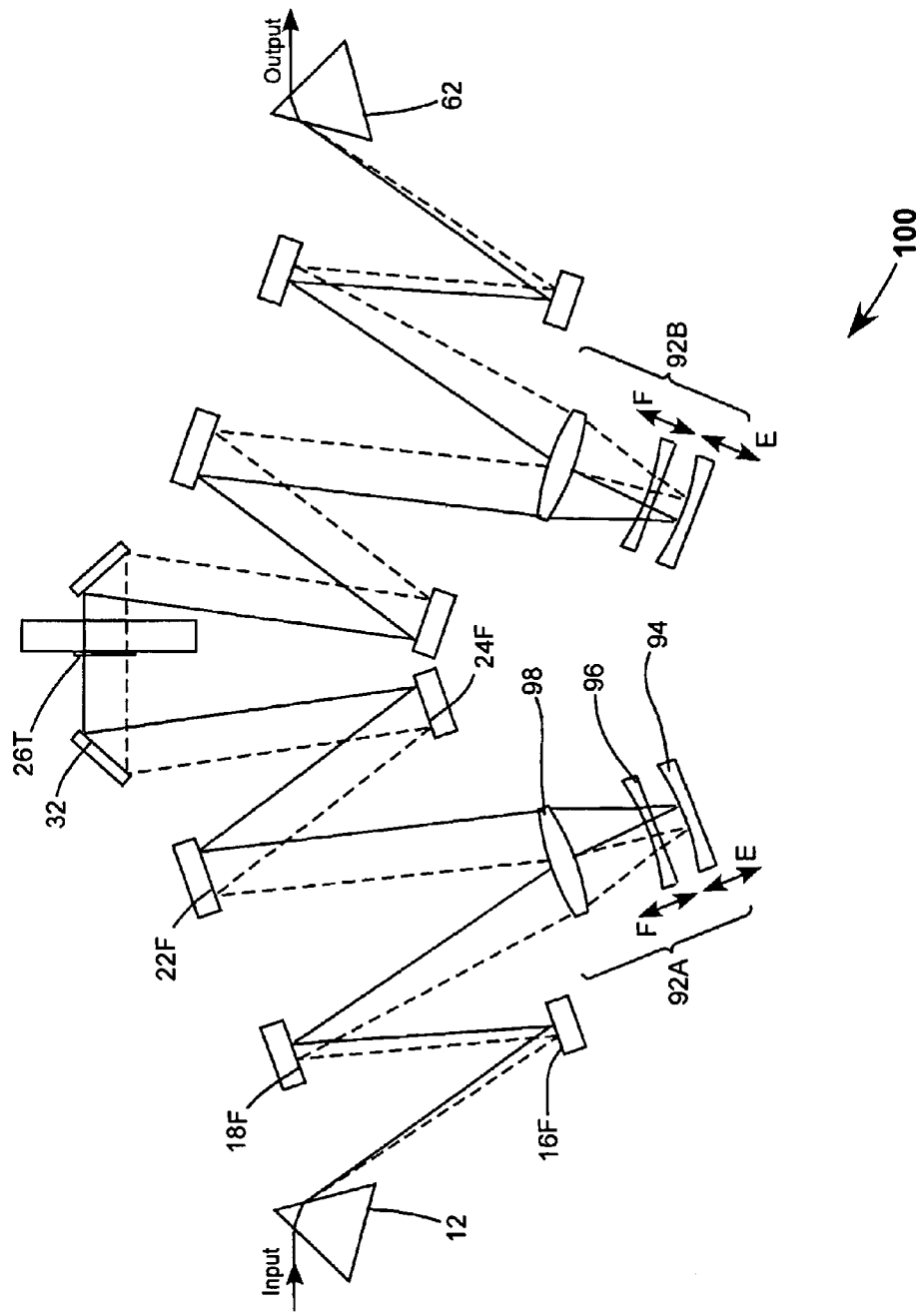
FIG. 10 schematically illustrates another additional preferred embodiment of a pulse-shaper in accordance with the present invention similar to the embodiment of FIG. 5, but including two zoom-mirrors arranged such that the selectively variable optical delay lines are not required.

FIG. 10 schematically illustrates an additional preferred embodiment of a pulse-shaper in accordance with the present invention similar to the transmissive embodiment of FIG. 5, but including two zoom-mirrors 92 (designated here as zoom mirrors 92A and 92B) arranged such that the selectively variable optical delay lines are not required. Fixed folding mirrors 16F, 18F, 22F, and 24F are provided to fold the optical path. Corresponding fixed folding mirror are provided on the output side of the system.

Those skilled in the art will recognize without further detailed description or illustration that while the present invention has been described above with reference to using a prism as a dispersive optical element the invention, that any other dispersive optical element such as a grating or a prism (combination of a grating and a prism) could be used. Those skilled in the art will also recognize that spatial light modulator 26 may be any light modulator which modulates phase, amplitude or both, including, but not limited to electrical, optical, acousto-optical, mechanical, liquid crystal or a MEMS (micro-electro-mechanical-system). Further, pulses to be shaped may be pulses of radiation having any center wavelength in any wavelength range including ultraviolet (UV) wavelengths, visible wavelengths, and infrared wavelengths, recognizing, of course, that the wavelength of a pulse to be shaped may influence the selection of a particular dispersive element or light modulator. These and other substitutions may be made without departing from the spirit and scope of the present invention.

In summary, the present invention is described above in terms of a preferred and other embodiments. The invention is not limited, however, to the embodiment described and depicted. Rather, the invention is limited only by the claims appended hereto.

What is claimed is:

1. Apparatus for shaping an optical pulse, comprising:
a dispersive optical element, an optical delay line having a selectively variable optical path length, and a spatial light modulator; and
wherein the dispersive optical element, the optical delay line, and the spatial light modulator are configured and arranged such that the optical pulse is received by the dispersive optical element and dispersed into spectral components of the pulse in one transverse axis of the apparatus, the dispersed components are collimated in the optical delay line and are delivered to the spatial light modulator, the collimated spectral components are selectively modulated by the spatial light modulator and return from the spatial light modulator back through the optical delay line, and the selectively modulated spectral components are focused by the optical delay line onto the dispersive optical element, and are recombined by the dispersive optical element to form a shaped output pulse.

2. The apparatus of claim 1, wherein the variable optical delay line includes first and second pairs of mirrors spaced apart and parallel to each other, each pair of mirrors being selectively tiltable about a second transverse axis of the apparatus perpendicular to the first transverse axis, with an optical device having positive optical power being located between the pairs of mirrors for collimating the dispersed spectral components and focusing the selectively modulated spectral components.

3. The apparatus of claim 2, wherein the optical device having positive optical power is a concave mirror.

4. The apparatus of claim 1, wherein the variable optical delay line includes a pair of mirrors spaced apart and parallel to each other, the pair of mirrors being selectively tiltable about a second transverse axis of the apparatus perpendicular to the first transverse axis, with an optical arrangement having selectively variable optical power being located between the pair of mirrors and the spatial light modulator for collimating the dispersed spectral components and focusing the selectively modulated spectral components.

5. The apparatus of claim 4, wherein the optical arrangement having variable optical power is a zoom lens including an afocal zoom group of optical elements and a focusing lens with at least one of the zoom-group optical elements being selectively axially movable for selectively varying the optical power.

6. The apparatus of claim 5, wherein the zoom group of optical elements includes in sequence a first element having positive optical power, and second element having negative optic power, and a third element having positive optical power, the first and second elements being movable.

7. The apparatus of claim 6, wherein the focusing lens of the zoom lens is a single optical element.

8. The apparatus of claim 6, wherein the spatial light modulator is axially spaced from the zoom lens by about the focal length of the focusing lens of the zoom lens.

9. The apparatus of claim 1, wherein the dispersive optical element is a prism.

10. The apparatus of claim 1, wherein the spatial light modulator is a liquid-crystal spatial light modulator.

11. Apparatus for shaping an input optical pulse, comprising:
a prism, an optical delay line, a spatial light modulator and a concave mirror, said optical delay line including first and second pairs of mirrors, with mirrors in each pair being spaced apart and parallel to each other, and the concave mirror being located between the first and second pairs of mirrors;
wherein the prism, the optical delay line, and the spatial light modulator are arranged such that the pulse is received by the prism and dispersed into spectral component of the pulse diverging in a first transverse optical axis of the apparatus, the dispersed components are multiply reflected along a first zigzag optical path between said first pair of mirrors to the concave mirror, the dispersed spectral components are collimated by the concave mirror and follow a second zigzag optical path between said second pair of mirrors to the spatial light modulator and are selectively modulated thereby, the selectively modulated spectral components follow a third zigzag optical path between the second pair of mirrors to the concave mirror and are focused by the concave mirror at said prism to form an output pulse after following a fourth zigzag optical path between the first pair of mirrors; and
wherein, the first and second pairs of mirrors are selectively rotatable about a second transverse axis perpendicular to the first transverse axis for varying the length of the zigzag optical paths between the mirrors.

12. The apparatus of claim 11, wherein the concave mirror has a focal length about equal to the length of said first optical path through said first pair of mirrors from the prism to the concave mirror.

13. The apparatus of claim 12, wherein the length of said second optical path through said second pair of mirrors from said concave mirror to said spatial light modulator is about equal to the focal length of said concave mirror.

14. Apparatus for shaping an input optical pulse, comprising:
a dispersive optical element, an optical delay line, a spatial light modulator and a zoom lens, the optical delay line including a pair of mirrors, with mirrors in the pair being spaced apart and parallel to each other, and the zoom lens being located between the pair of mirrors and the spatial light modulator;
wherein the dispersive optical element, the optical delay line, and the spatial light modulator are arranged such that the pulse is received by the dispersive optical element and dispersed into spectral components of the pulse diverging in a first transverse optical axis of the apparatus, the dispersed components are multiply reflected along a first zigzag optical path between the pair of mirrors to the zoom lens, the dispersed spectral components are collimated by the zoom lens and follow a second optical path to the spatial light modulator and are selectively modulated thereby, the selectively modulated spectral components follow a third optical path to the zoom lens and are focused by the zoom lens at the dispersive optical element to form an output pulse after following a fourth zigzag optical path between the pair of mirrors; and
wherein, the pair of mirrors is selectively rotatable about a second transverse axis perpendicular to the first transverse axis for varying the length of the zigzag optical paths between the mirrors.

15. The apparatus of claim 14, wherein the zoom lens includes an afocal zoom group of refractive optical elements, at least one of which is movable, the afocal zoom group elements cooperative with a focusing lens, wherein zoom lens is arranged such that the dispersed spectral components from the first optical path traverse the zoom group elements to reach the focusing lens of the zoom lens, and wherein the length of the second optical path is about equal to the focal length of the focusing lens of the zoom lens.

16. Apparatus for shaping an optical pulse, comprising:
a dispersive optical element;
a spatial light modulator; and
a zoom optical arrangement having selectively variable optical power located on an optical path between the dispersive optical element and the spatial light modulator.

17. The apparatus of claim 16, wherein the dispersive optical element, the zoom optical arrangement and the spatial light modulator are configured and arranged such that the optical pulse is received by the dispersive optical element and dispersed into a diverging beam including spectral components of the pulse in one transverse axis of the apparatus, the dispersed components are collimated by the zoom optical arrangement and are delivered to the spatial light modulator, the collimated spectral components are selectively modulated by the spatial light modulator and return from the spatial light modulator back through the zoom optical arrangement, are focused by the zoom optical arrangement onto the dispersive optical element, and are recombined by the dispersive optical element to form a shaped output pulse.

18. The apparatus of claim 17, wherein the zoom optical arrangement includes a first optical element having positive optical power, a second optical element having positive optical power, and a third optical element having negative optical power located between the first and second optical elements, with axial spacing between the first and second optical elements, and between the second and third optical elements being selectively variable.

* * * * *